P. B. CRANE.
DEEP TILLING MACHINE.
APPLICATION FILED SEPT. 17, 1915.

1,308,169.

Patented July 1, 1919.
3 SHEETS—SHEET 1.

WITNESSES

INVENTOR
PETER B. CRANE
BY
ATTORNEYS

P. B. CRANE.
DEEP TILLING MACHINE.
APPLICATION FILED SEPT. 17, 1915.

1,308,169.

Patented July 1, 1919.
3 SHEETS—SHEET 3.

INVENTOR
PETER B. CRANE
BY
ATTORNEYS

WITNESSES

UNITED STATES PATENT OFFICE.

PETER B. CRANE, OF LONG LAKE, MINNESOTA.

DEEP-TILLING MACHINE.

1,308,169.   Specification of Letters Patent.   Patented July 1, 1919.

Application filed September 17, 1915. Serial No. 51,180.

*To all whom it may concern:*

Be it known that I, PETER B. CRANE, citizen of the United States, resident of Long Lake, county of Hennepin, State of Minnesota, have invented certain new and useful Improvements in Deep-Tilling Machines, of which the following is a specification.

My invention relates to a disk tilling machine wherein a single disk is employed for turning a furrow, one carrying wheel traveling on the landside of the machine and another wheel traveling in the furrow previously cut by the disk.

A disk plow as generally constructed will plow a deep furrow in soft soil where there is but little resistance and a shallow furrow in hard-resisting soil. This obviously does not produce a desirable result, as there is lack of uniformity in the depth of the seeding bed and uneven growth of the plants. The primary object of my invention is to provide a disk plow which will reach a greater depth and will maintain a uniform depth or cut and width of furrow regardless of soil conditions and resistance to the disk.

A further object is to provide means for resisting or overcoming the natural tendency of the plow disk to work to the landward side as the machine is moved along.

A further object is to provide a construction which will adapt the plow particularly for work on a side hill.

The invention consists generally in various constructions and combinations, all as hereinafter described and particularly pointed out in the claims.

In the accompanying drawings forming part of this specification,

Figure 1:
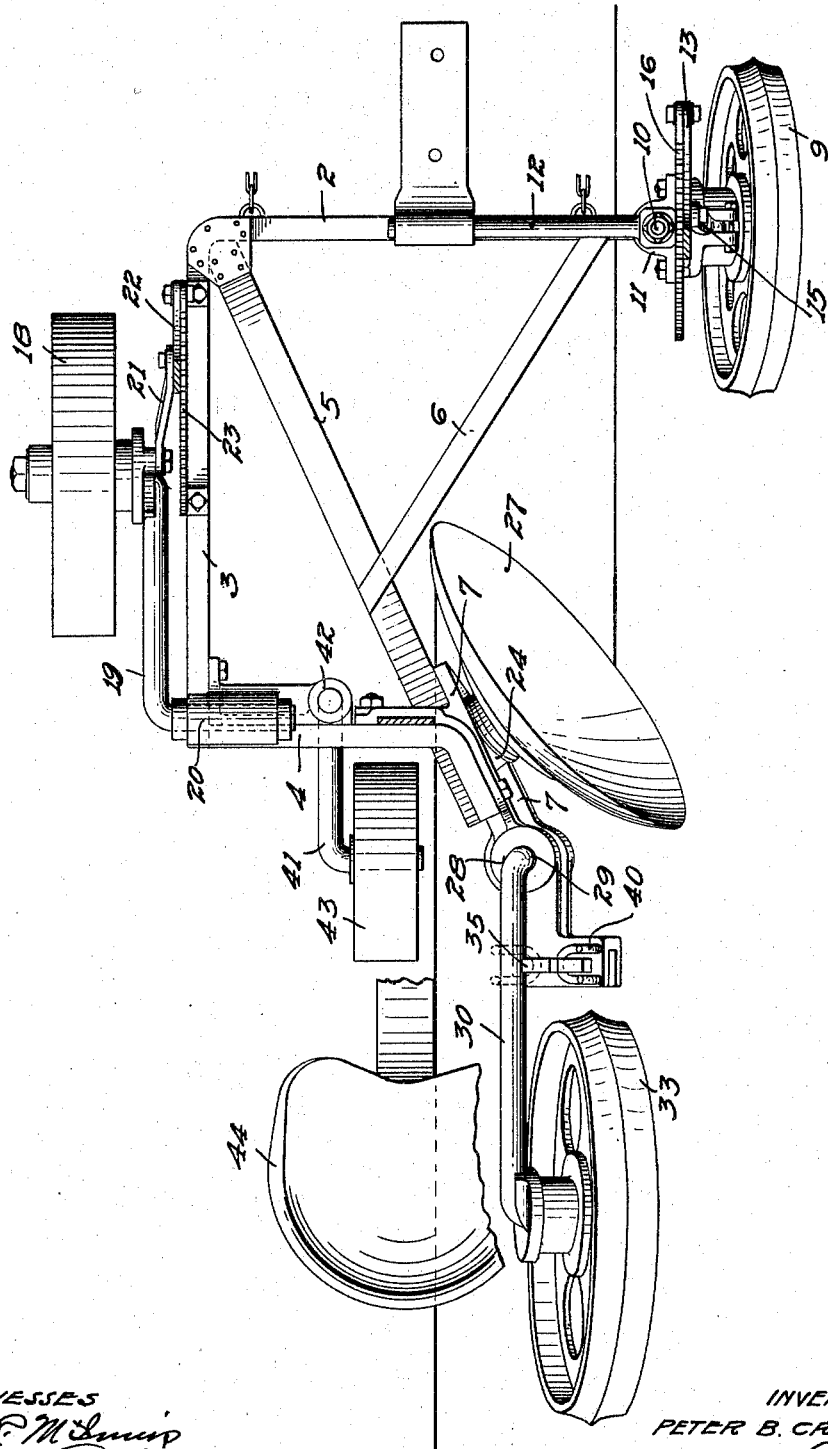
Figure 1 is a plan view of a disk tilling machine embodying my invention.
Figure 2:
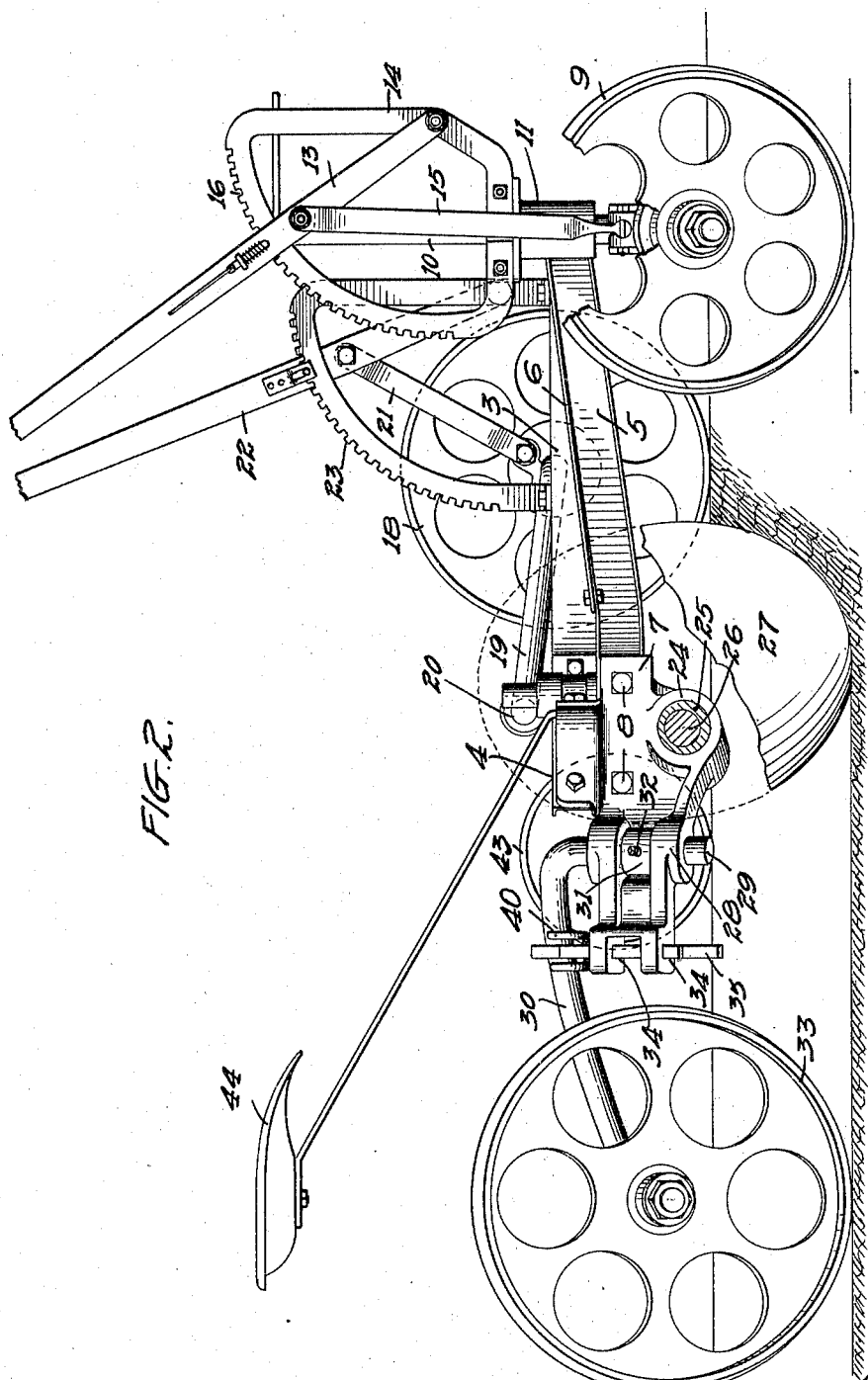
Fig. 2 is a side elevation, partially in section, illustrating the preferred manner of mounting the disk on the frame.

In the drawing, 2 represents the forward portion of the frame having a right-angled, rearwardly extending side portion 3 terminating in a part 4 which extends substantially parallel with the forward portion 2. Braces 5 and 6 are provided for securing the forward and rear portions of the frame together and holding them in their proper relative position. The brace 5 has the function of transmitting the draft from the forward portion of the machine back to the plow disk and forms a direct connection between the disk and the motive power.

A casting 7 is mounted upon the brace 5 and is rigidly secured thereto by bolts 8 or other suitable means. A carrying wheel 9 is mounted on the lower end of a spindle 10 that is journaled in bearings 11 and has an arm 12 at its upper end projecting inwardly over the forward portion of the frame 2 for convenience in rocking the spindle 10 and changing the angle of the wheel 9 with respect to the wall of the furrow. The spindle 10 is free to slide vertically in its bearing and is raised and lowered by suitable means, preferably a lever 13 pivoted on a frame 14 that is mounted on the bearing 11 and connected by a link 15 with the lower portion of the spindle. The lever is movable over a rack 16. On the opposite side of the frame is a wheel 18 journaled on an arm 19 that is pivoted at 20 on the rear portion of the frame. This arm 19 is rocked in a vertical plane to raise or lower the wheel 18 by means of a link 21 connecting said arm with an operating lever 22 that is movable over a toothed rack 23. By the adjustment of these levers the position of the supporting wheels can be changed as desired in the operation of the machine.

The casting 7 has a box 24 formed thereon with a bearing 25 for the stud 26 of a disk 27. This disk stands at an angle to the direction of movement of the machine and is concavo-convex in form, with its concave face toward the front of the machine. The angle of the disk to the work is such that it cuts into the soil, turning over a furrow as usual in machines of this type.

The bearing of the disk 27, as shown in

Fig. 1, is located opposite the box or bearing 20 for the arm 19. The object of this is to counter-act the tendency of the disk to work into the land and overcome the side motion of the disk. I have found from actual test that a plow disk mounted in this way can be accurately controlled and its side movement regulated with far better results than has been possible in machines of this type as ordinarily constructed.

In the rear of the bearing of the disk I prefer to provide a socket 28 to receive the depending end 29 of an arm 30, said end being provided with a collar 31 having a set screw 32 for locking the collar on the end of the arm. When this set screw is loosened, the arm may be adjusted vertically to raise or lower the rear carrying wheel 33 in regulating the depth of cut of the disk.

The socket 28 into which the end of the arm 30 is inserted prevents the disk from sagging off to the right when plowing on a side hill. The angle of this socket forces the disk to work toward the left or up the hill and on extremely steep side hills a lock device is provided as will hereinafter appear. This manner of mounting the arm 30 in its socket also operates to raise the disk out of the soil in making a haw turn. This latter I regard as an important feature of the invention, as the haw turn is the one most frequently made with a machine of this type and by mounting the arm in the manner described the plow disk will be automatically raised without the operation of any of the levers.

Figure 3:
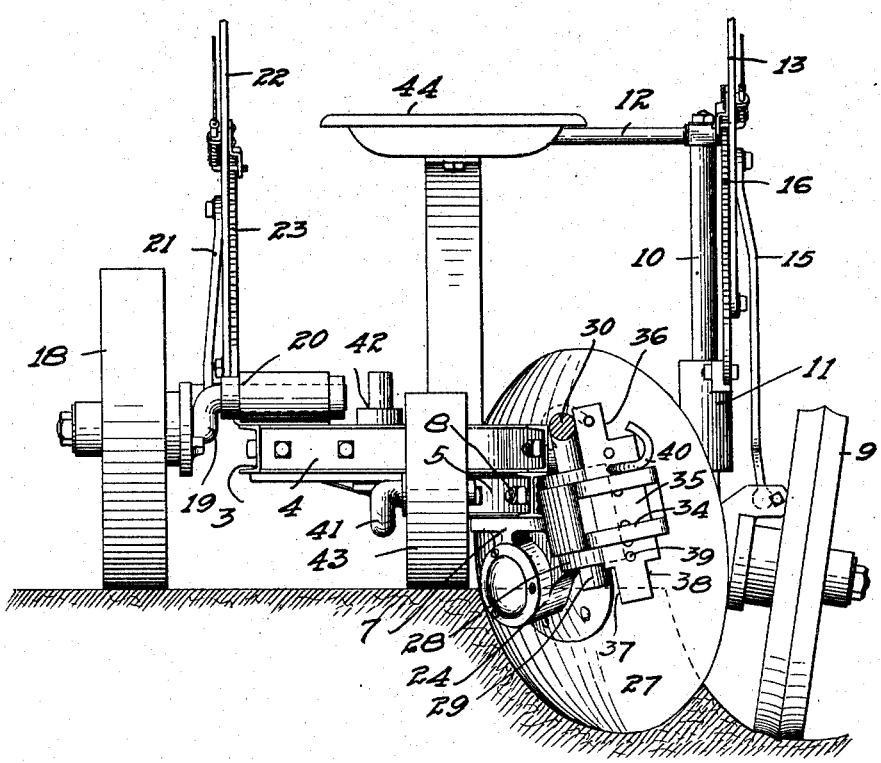
Fig. 3 is an elevation, transversely of the machine, taken on a line between the rear of the frame and the front of the rear supporting wheel.
Figure 4:
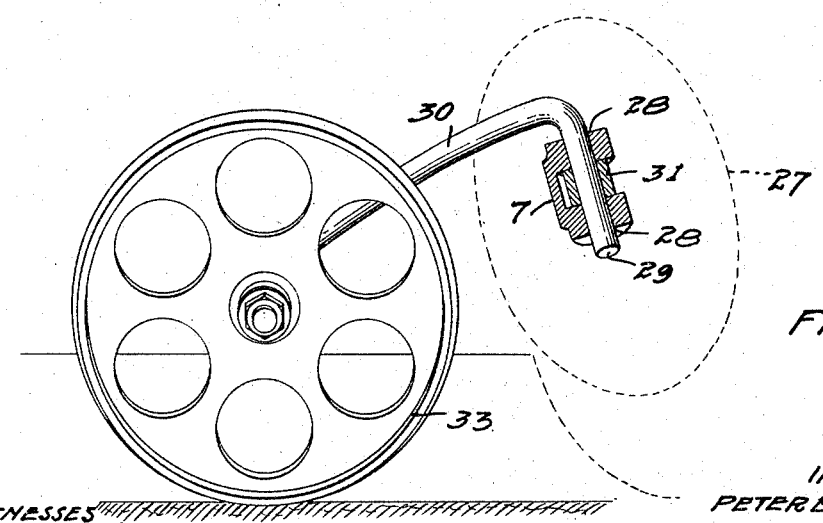
Fig. 4 is a detail view, showing the manner of mounting the wheel in the frame and its relation to the disk.

In the rear of the socket 28 the casting is provided with a slot 34 into which a plate 35 is inserted. This plate has notches of varying depth in its longitudinal edges and is adapted to bear on the rearwardly extending portion of the arm 30, as shown plainly in Fig. 3. As there shown, the arm is in contact with the straight edge of the plate and is held thereby inwardly toward the landside of the machine. In case, however, the plate 35 is reversed, the arm may enter the notch 36 and thereupon be free to swing for a limited distance outwardly. The other end of the plate is provided with notches 37 and 38 of varying depth and when the plate is inverted, one of these notches will be brought into position to receive the arm 30. The plate is provided with holes 39 to receive the pin 40 having a hooked end that is adapted to slip over the arm 30, as shown in Fig. 1, and hold the disk up to the work when the machine is in use on an extremely steep side hill. The notches of varying depth in the plate 35 regulate the lateral movement of the casting whereon the plow disk is supported and determine the width of the furrow. For instance, in Fig. 1 the plate is shown with its straight edge in contact with the arm and the disk is cutting a narrow furrow. Should this plate be reversed, the frame of the machine or the casting supporting the plow disk will be free to move inwardly toward the landside of the machine and will thereby allow the disk to cut farther into the land and increase the width of the furrow. Furrows of varying width may be turned by the reversal or inversion of this plate to present notches of different depth to receive the wheel-supporting arm.

I prefer also to provide an arm 41 journaled at 42 to the rear portion of the frame and carrying a wheel 43 that is free to oscillate with the arm 41 in the bearing 42 and regulate the elevation of the rear portion of the frame. By the vertical adjustment of this wheel any depth of furrow can be obtained and the disk will be prevented from working beyond the desired depth in soil of less resistance. I am thus able to provide for a uniform depth of furrow in all conditions of soil. The machine is provided with the usual seat 44.

In the operation of the machine, the wheel 43 will prevent the disk from digging into loose soil while the load on the rear portion of the frame will hold the disk down in hard, tenacious soil to the same depth and thereby obtain a uniform depth of seed bed. The adjustment of the locking device for the arm 30 will regulate the width of the furrow and the tendency of the disk to dig into the soil on side hill, the lock device being utilized whenever necessary to hold the arm and disk in their proper relative position.

In various ways the details of construction herein shown and described may be modified and still be within the scope of my invention.

I claim as my invention:

1. A tilling machine comprising a frame, carrying wheels for the forward portion of said frame, one of said wheels being mounted to run in the furrow and the other on the land, an arm whereon said land wheel is mounted having a horizontal axis in the rear of said wheel, a single plow disk, journaled on the opposite side of said frame at an angle to the axis of said land wheel arm and opposite thereto and a wheel in the rear of said disk mounted to travel in the furrow last made thereby.

2. A tilting machine comprising a frame and carrying wheels therefor, a plow disk mounted in said frame with its axis at an angle to the direction of movement of the machine, an arm having a bearing in said frame in the rear of said disk, said bearing being inclined to the land side, a wheel mounted on the rear portion of said arm to travel in the furrow last made by said disk and inclined away from the landside, said arm operating to raise said disk out of the soil in making a haw turn.

3. A tilling machine comprising a frame and carrying wheels for the forward portion thereof, a plow disk having a bearing in said frame, an arm having a downwardly turned forward end journaled in said frame in the rear of said disk, said downwardly turned end being tilted toward the landside, the rear end of said arm being outwardly and downwardly turned and a wheel mounted on said downwardly turned end to travel in the furrow last made by said disk and inclined toward the previously made furrows.

4. A tilling machine comprising a frame and carrying wheels therefor, a disk mounted in said frame, an arm having a bearing inclined toward the landside of the machine and projecting rearwardly from said disk, and operating to raise said disk out of the soil in making a haw turn, a wheel mounted on said arm to travel in the furrow, and means mounted to engage said arm in the rear of its bearing to lock it against stubbleward oscillation, for the purpose specified.

5. A tilling machine comprising a frame having carrying wheels, a disk mounted in said frame, an arm having a bearing in said frame and projecting rearwardly from said disk, a wheel carried by said arm and a notched plate mounted to contact with said arm in the rear of its bearing, said plate being reversible to present notches of different depth to said arm to regulate its angle with respect to the draft line of the machine and the width of the furrow.

6. A tilling machine comprising a frame having carrying wheels, a plow disk mounted therein at an angle to the draft line of the machine, an arm having bearings in said frame and projecting rearwardly of said disk, and operating to lift said disk out of the soil in making a haw turn, a carrying wheel mounted on said arm and means for adjusting the angle of said arm with respect to the draft line to regulate the width of the furrow.

7. A tilling machine comprising a frame having carrying wheels, a plow disk mounted therein at an angle to the draft line of the machine, an arm having bearings in said frame and projecting rearwardly of said disk, and operating to raise said disk out of the ground in making a haw turn, a carrying wheel mounted on said arm, said arm being normally free to oscillate toward the landside and means for locking it against oscillation toward the landside or stubbleward.

8. A tilling machine comprising a frame, a draft brace diagonally mounted therein, a casting whereto said brace is secured, a plow disk journaled in said casting and inclined with respect to the draft line of the machine, said casting having a socket therein in the rear of said disk inclined toward the landside of the machine, a rearwardly projecting arm having a depending end fitting within said socket, a wheel carried by said arm, said arm and wheel tilting said disk out of the soil when the machine is turned.

9. A tilling machine comprising a frame having carrying wheels, a disk mounted in said frame at an angle to the direction of movement of the machine, a wheel in the rear of said disk and mounted in said frame to travel in the furrow previously made by said disk and tilt said disk out of the soil when the machine is making a haw turn.

10. A tilling machine comprising a frame having carrying wheels, a disk mounted in said frame at an angle to the direction of movement of the machine, a wheel mounted to travel in the furrow in the rear of said disk, and a wheel mounted to travel on the stubble side of the land adjacent to the wall of the furrow and in the rear of and close to the axis of said disk and regulating the depth of cut of said disk.

11. A tilling machine comprising a frame, a disk mounted therein, a carrying wheel in front of said disk to travel in a previously turned furrow, a second carrying wheel also in front of said disk and mounted to travel on the land and having a bearing on said frame adjacent to and substantially in line with the axis of said disk, and a wheel mounted to travel in the furrow in the rear of said disk and having a supporting arm mounted on an axis that is inclined to the vertical.

12. A tilling machine comprising a frame having carrying wheels, a disk mounted in said frame, a wheel mounted in said frame in the rear of said disk to travel in the furrow cut thereby, a wheel mounted to travel on the land adjacent the furrow in the rear of and adjacent to the bearing of said disk and vertically adjustable in said frame for regulating the depth of cut of said disk, and a driver's seat mounted on said frame above said wheel.

13. A tilling machine comprising a frame, carrying wheels for the forward portion of said frame, one of said wheels being mounted to run in the furrow and the other on the land, said land wheel being mounted for movement in a vertical plane, a plow disk mounted on said frame in the rear of both of said wheels and inclined toward said land wheel, and a wheel mounted in the rear of said disk to travel in the furrow made thereby and inclined toward the previously made furrow, the support for said rear wheel having a bearing in said frame that is tilted toward the landside.

14. A tilling machine comprising a frame, carrying wheels for the forward portion of said frame, one of said wheels being mounted to run in the furrow and the other on the land, a support for the land wheel having a horizontal axis in the rear of the wheel, a single plow disk journaled on said frame at an angle to the axis of said land wheel support and opposite and adjacent thereto, and a wheel in the rear of said disk to travel in the furrow last made thereby and having a bearing on said frame in the rear of the bearing of said disk and inclined toward the furrow side, substantially as described.

In witness whereof I have hereunto set my hand this 13th day of September, 1915.

PETER B. CRANE.

Copies of this patent may be obtained for five cents each, by addressing the "Commissioner of Patents, Washington, D. C."